United States Patent Office.

AMOR SMITH, OF CINCINNATI, OHIO.

Letters Patent No. 60,948, dated January 1, 1867.

IMPROVED FERTILIZER.

The Schedule referred to in these Letters Patent and making part of the same.

TO ALL WHOM IT MAY CONCERN:

Be it known that I, AMOR SMITH, of Cincinnati, in the county of Hamilton, and State of Ohio, have invented a new and useful Process for Preparing and Preserving the Refuse from the Tanks or Tubs where Animal Matter is Boiled for use as a Fertilizer for the land; and I do hereby declare that the following is a full, clear, and exact description of the same.

The refuse or offal from the tanks or tubs used in boiling animal matter has heretofore been either lost or so imperfectly prepared by a process of drying as to lose a large part of its real value. In preparing it for use so that it will not be subject to decomposition, I first collect it from the tanks or tubs, or wheresoever else it may be found, and then press it in a hydraulic or other suitable press. After being thus subjected to pressure, it is no longer liable to decomposition, and may be prepared for use as a fertilizer, for which it is valuable. I do not claim the process of its preparation for such use subsequent to its leaving the press, but only to that part of the process which applies to its preservation against decomposition.

What I claim as my invention, and desire to secure by Letters Patent, is—

The hereinbefore-described process for preserving the fleshy parts of boiled animal matter from decomposition by subjecting it to pressure, substantially as set forth.

In testimony whereof I have signed my name to this specification in the presence of two subscribing witnesses.

AMOR SMITH.

Witnesses:
   JOHN W. CARTER,
   Z. ED. MCKINNEY.